United States Patent
Sugitani et al.

(10) Patent No.: US 9,776,623 B2
(45) Date of Patent: Oct. 3, 2017

(54) FOUR-WHEEL DRIVE ELECTRIC VEHICLE CONTROL DEVICE

(71) Applicant: Nissan Motor Co., Ltd., Yokohama-shi, Kanagawa (JP)

(72) Inventors: Osamu Sugitani, Kanagawa (JP); Koutarou Tanaka, Kanagawa (JP); Keishirou Nakamura, Kanagawa (JP); Toshiyuki Myochin, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/025,313

(22) PCT Filed: Oct. 10, 2013

(86) PCT No.: PCT/JP2013/077559
§ 371 (c)(1),
(2) Date: Mar. 28, 2016

(87) PCT Pub. No.: WO2015/052808
PCT Pub. Date: Apr. 16, 2015

(65) Prior Publication Data
US 2016/0229392 A1  Aug. 11, 2016

(51) Int. Cl.
*B60W 20/14* (2016.01)
*B60K 6/365* (2007.10)
(Continued)

(52) U.S. Cl.
CPC ............ *B60W 20/14* (2016.01); *B60K 6/365* (2013.01); *B60K 6/445* (2013.01); *B60K 6/52* (2013.01);
(Continued)

(58) Field of Classification Search
CPC ...... B60W 20/14; B60W 10/06; B60W 10/08; B60W 10/10; B60K 17/35; B60K 6/52;
(Continued)

(56) References Cited

U.S. PATENT DOCUMENTS

2012/0203416 A1* 8/2012 Yoshimura ............. B60K 6/445
701/22

FOREIGN PATENT DOCUMENTS

CN          102897041 A     1/2013
DE   10 2011 056 046 A1    6/2013
(Continued)

*Primary Examiner* — Genna Mott
(74) *Attorney, Agent, or Firm* — Global IP Counselors, LLP

(57) ABSTRACT

A four-wheel drive electric vehicle control device is provided for a four-wheel drive electric vehicle that has a motor/generator as a drive source, and an electronically controlled coupling provided on the drive power transmission path leading from the drive source to the front and rear wheels. The four-wheel drive hybrid vehicle has a 4WD control unit that outputs to the electronically controlled coupling a transmission torque command value to bring about the four-wheel drive state, in accordance with the vehicle state. The 4WD control unit has a regenerative control intervention-coordinating controller that, when regenerative control by the motor/generator has intervened during the four-wheel drive state, brings the transmission torque of the electronically controlled coupling to zero before initiating regenerative control.

11 Claims, 7 Drawing Sheets

(51) Int. Cl.
- *B60K 6/445* (2007.10)
- *B60K 6/52* (2007.10)
- *B60L 11/18* (2006.01)
- *B60W 10/06* (2006.01)
- *B60W 10/08* (2006.01)
- *B60W 10/10* (2012.01)
- *B60K 17/35* (2006.01)
- *B60L 7/10* (2006.01)

(52) U.S. Cl.
CPC ............... *B60K 17/35* (2013.01); *B60L 7/10* (2013.01); *B60L 11/1809* (2013.01); *B60W 10/06* (2013.01); *B60W 10/08* (2013.01); *B60W 10/10* (2013.01); *B60L 2260/28* (2013.01); *B60Y 2200/91* (2013.01); *B60Y 2200/92* (2013.01); *B60Y 2300/89* (2013.01); *B60Y 2400/82* (2013.01); *Y02T 10/6239* (2013.01); *Y02T 10/6265* (2013.01); *Y10S 903/916* (2013.01); *Y10S 903/93* (2013.01)

(58) Field of Classification Search
CPC ........... B60K 6/365; B60K 6/445; B60L 7/10; B60L 11/1809; Y02T 10/6265; Y10S 903/93; Y10S 903/916; B60Y 2400/82; B60Y 2200/91

See application file for complete search history.

(56) References Cited

FOREIGN PATENT DOCUMENTS

| | | |
|---|---|---|
| JP | H09-322312 A | 12/1997 |
| JP | 10-304509 A | 11/1998 |
| JP | 2000-43696 A | 2/2000 |
| JP | 2003-327000 A | 11/2003 |
| JP | 2004-142726 A | 5/2004 |
| JP | 2006-248319 A | 9/2006 |
| JP | 2007-56933 A | 3/2007 |
| JP | 2011-173440 A | 9/2011 |
| JP | 2011-251628 A | 12/2011 |
| JP | 2012-105461 A | 5/2012 |
| JP | 2013-116697 A | 6/2013 |
| JP | 2014-125110 A | 7/2014 |

\* cited by examiner

FOUR-WHEEL DRIVE ELECTRIC VEHICLE CONTROL DEVICE

CROSS-REFERENCE TO RELATED APPLICATIONS

This application is a U.S. National stage application of International Application No. PCT/JP2013/077559, filed Oct. 10, 2013.

BACKGROUND

Field of the Invention

The present invention relates to a control device for a four-wheel drive electric vehicle, in which the drive source has a motor/generator, and an electronically controlled coupling is provided on the drive power transmission path leading from the drive source to the front and rear wheels, which controls the power distribution of the front and rear wheels by a command from the outside.

Background Information

Conventionally a 4WD system comprising an electronically controlled coupling on the drive power transmission path from the drive source to the front and rear wheels, which controls the power distribution of the front and rear wheels by a command from the outside, is known (for example, refer to Japanese Laid Open Patent Application No. 2003-327000).

SUMMARY

However, in the above-described 4WD system, there is the problem that, in the case of an electric vehicle comprising a motor/generator as a drive source, if regenerative braking is carried out using the motor/generator, shock could occur due to fluctuation in the transmission torque. That is, if regenerative control intervenes in a state in which there is residual torque by the drive torque in the electronically controlled coupling, when the brake is depressed after an accelerator releasing operation, a coast torque (torque in the reverse direction of the drive torque) is inputted to the electronically controlled coupling, and a torque fluctuation occurs.

In view of the problem described above, an object of the present invention is to provide a control device for a four-wheel drive electric vehicle that is able to prevent an occurrence of shock due to an intervention of regenerative control while in a four-wheel drive state.

In order to achieve the object described above, the present invention comprises, in the drive source, a motor/generator, and is comprising an electronically controlled coupling on the drive power transmission path form the drive source to the front and rear wheels, which controls the power distribution of the front and rear wheels by a command from the outside. This control device for a four-wheel drive electric vehicle is comprising a four-wheel drive power distribution control means that outputs to the electronically controlled coupling a transmission torque command value to bring about the four-wheel drive state, in accordance with the vehicle state. The four-wheel drive power distribution control means has a regenerative control intervention-coordinating controller that, when regenerative control by the motor/generator has intervened during the four-wheel drive state, brings the transmission torque of the electronically controlled coupling to zero before initiating regenerative control.

Thus, when regenerative control by the motor/generator has intervened during the four-wheel drive state, a cooperative control to bring the transmission torque of the electronically controlled coupling to zero is carried out. That is, the residual torque of the electronically controlled coupling (drive torque) becomes zero before the coast torque occurring due to the intervention of regenerative control is inputted to the electronically controlled coupling. Accordingly, torque transmission of the electronically controlled coupling is suppressed, even if regenerative control has intervened. As a result, it is possible to prevent shock from occurring due to the intervention of regenerative control while operating in the four-wheel drive state.

BRIEF DESCRIPTION OF THE DRAWINGS

Referring now to the attached drawings which form a part of this original disclosure.

DETAILED DESCRIPTION OF THE EMBODIMENTS

Figure 1:
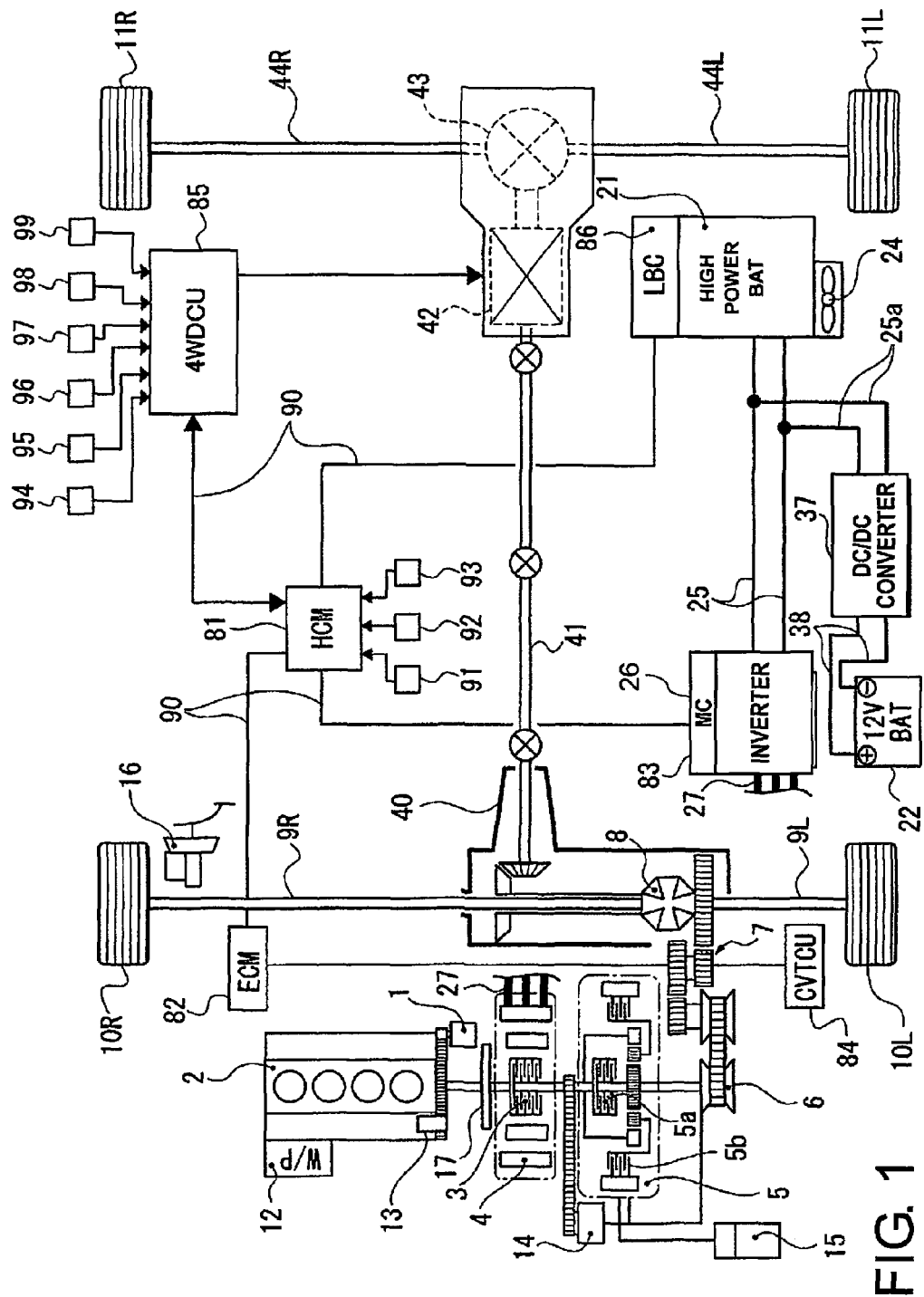
FIG. 1 is an overall system view illustrating an FF base four-wheel drive hybrid vehicle (one example of a four-wheel drive electric vehicle) to which is applied the control device of the first embodiment.

A preferred embodiment for realizing the control device for a four-wheel drive electric vehicle of the present invention will be described below based on the first embodiment illustrated in the drawings.

First Embodiment

The configuration is described first. The "overall system configuration," the "detailed configuration of the electronically controlled coupling," and the "regenerative control intervention-coordinating control" will be separately described regarding the configuration of the FF base four-wheel drive hybrid vehicle (one example of a four-wheel drive electric vehicle) to which is applied the control device of the first embodiment.

Overall System Configuration

FIG. 1 illustrates the overall system of an FF base four-wheel drive hybrid vehicle. The overall system configuration of the FF base four-wheel drive hybrid vehicle will be described below, based on FIG. 1.

A front wheel drive system of an FF base four-wheel drive hybrid vehicle is comprising a starter motor 1, a transverse engine 2, a first clutch 3 (abbreviated "CL1"), a motor/generator 4 (abbreviated "MG"), a second clutch 5 (abbreviated "CL2"), and a belt type continuously variable transmission 6 (abbreviated "CVT"), as illustrated in FIG. 1. An output shaft of the belt type continuously variable transmission 6 is drivingly coupled to left and right front wheels 10R, 10L, via a final reduction gear train 7, a differential gear 8, and left and right drive shafts 9R, 9L.

The starter motor 1 is a cranking motor having a gear that meshes with an engine starting gear provided to a crankshaft of the transverse engine 2, and which rotationally drives the crankshaft at the time of engine start. This starter motor 1 is driven with a 12V battery 22 as a power source.

The transverse engine 2 is an engine disposed in a front room with the crankshaft direction as the vehicle width direction, comprising an electric water pump 12, and a crankshaft rotation sensor 13 that detects a reverse rotation of the transverse engine 2.

The first clutch 3 is a hydraulically actuated normally open dry multi-plate friction clutch which is interposed between the transverse engine 2 and the motor/generator 4, in which complete engagement/slip engagement/disengagement are controlled by a first clutch hydraulic pressure.

The motor/generator 4 is a three-phase alternating current permanent magnet type synchronous motor which is coupled to the transverse engine 2 via the first clutch 3. This motor/generator 4 uses a high power battery 21 described below as the power source, and an inverter 26, which converts direct current to three-phase alternating current during powering and converts three-phase alternating current to direct current during regeneration, is connected to the stator coil via an AC harness 27.

The second clutch 5 is a hydraulically actuated normally open dry multi-plate friction clutch which is interposed between the motor/generator 4 and the left and right front wheels 10R, 10L, which are drive wheels, in which complete engagement/slip engagement/disengagement are controlled by a second clutch hydraulic pressure. The second clutch 5 of the first embodiment is configured by diverting a forward clutch 5a and a reverse brake 5b provided to a forward/reverse switching mechanism of the belt type continuously variable transmission 6 configured by a planetary gear. That is, the forward clutch 5a is used as the second clutch 5 during forward traveling, and the reverse brake 5b is used as the second clutch 5 during reverse traveling.

The belt type continuously variable transmission 6 is a transmission that achieves a stepless transmission ratio by changing the winding diameter of the belt by applying shifting hydraulic pressure to a primary oil chamber and a secondary oil chamber. This belt type continuously variable transmission 6 comprises a main oil pump 14 (mechanical drive), a sub oil pump 15 (motor drive), and an unillustrated control valve unit that produces the first and second clutch hydraulic pressure and the shifting hydraulic pressure, using the line pressure PL generated by adjusting the pump discharge pressure from the main oil pump 14 as the source pressure. The main oil pump 14 is rotationally driven by a motor shaft of the motor/generator 4 (transmission input shaft). The sub oil pump 15 is mainly used as an auxiliary pump for producing lubrication and cooling oil.

A one-motor-two-clutch drive system is configured by the first clutch 3, the motor/generator 4, and the second clutch 5, and this drive system comprises an "EV mode," and an "HEV mode," as the main drive modes thereof. The "EV mode" is an electric vehicle mode in which the first clutch 3 is released and the second clutch 5 is engaged, and in which the motor/generator 4 is the only drive source; traveling by this "EV mode" is referred to as "EV traveling". The "HEV" mode is a hybrid vehicle mode in which both clutches 3, 5 are engaged, and in which the transverse engine 2 and the motor/generator 4 are the drive sources; traveling by this "HEV mode" is referred to as "HEV traveling."

The regenerative cooperation brake unit 16 in FIG. 1 is a device that controls the total braking torque, accompanying the fact that regenerative operation is carried out in principle during brake operation. This regenerative cooperation brake unit 16 comprises a brake pedal, a negative pressure booster that uses the intake negative pressure of the transverse engine 2, and a master cylinder. Then, at the time of a brake operation, the unit carries out a cooperative control of the regeneration amount/fluid pressure amount, so that the amount obtained by subtracting the regenerative braking force from the requested braking force based on the pedal operation amount is allotted to the hydraulic braking force.

A front wheel drive system of the FF base four-wheel drive hybrid vehicle is comprising a transfer 40, a propeller shaft 41, an electronically controlled coupling 42, a rear final drive 43, left and right rear wheel drive shafts 44R, 44L, and left and right rear wheels 11R, 11L, as illustrated in FIG. 1.

When the electronically controlled coupling 42 is engaged, the transfer 40 transmits the drive torque from the differential gear 8 to the rear wheels 11R, 11L via the propeller shaft 41, the electronically controlled coupling 42, the rear final drive 43, and the left and right rear wheel drive shafts 44R, 44L. The detailed configuration of the electronically controlled coupling 42 will be described later.

The power supply system of the FF hybrid vehicle is comprising a high power battery 21 as the motor/generator power source, and a 12V battery 22 as a 12V system load power source, as illustrated in FIG. 1.

The high power battery 21 is a secondary battery mounted as the power source of the motor/generator 4, and, for example, a lithium ion battery is used therefor, in which a cell module configured from a number of cells is set inside a battery pack case. A junction box which aggregates a relay circuit for carrying out supply/cutoff/distribution of heavy current is built in to this high power battery 21, and further attached thereto are a cooling fan unit 24 having a battery cooling function, and a lithium battery controller 86 which monitors the battery charge capacity (battery SOC) and the battery temperature.

The high power battery 21 and the motor/generator 4 are connected to the DC harness 25 and the inverter 26 via the AC harness 27. A motor controller 83 for performing powering/regeneration control is attached to the inverter 26. That is, the inverter 26 converts the direct current from the DC harness 25 to a three-phase alternating current to the AC harness 27 during powering, when the motor/generator 4 is driven by the discharge of the high power battery 21. In addition, the inverter converts the three-phase alternating current from the AC harness 27 to a direct current to the DC harness 25, during regeneration for charging the high power battery 21 with the power generation by the motor/generator 4.

The 12V battery 22 is a secondary battery mounted as a power source of a 12V system load, which is an auxiliary machine; for example, a lead battery mounted on an engine vehicle or the like is used. The high power battery 21 and the 12V battery 22 are connected via a DC branch harness 25a, a DC/DC converter 37, and a battery harness 38. The DC/DC converter 37 is for converting several hundred volts from the high power battery 21 to 12V, which is configured to manage the charging amount of the 12V battery 22 by controlling this DC/DC converter 37 with the hybrid control module 81.

The control system of an FF hybrid vehicle comprises a hybrid control module 81 (abbreviated: "HCM") as an integrated control means having a function to appropriately manage the energy consumption of the entire vehicle, as illustrated in FIG. 1. An engine control module 82 (abbreviated: "ECM"), a motor controller 83 (abbreviated: "MC"), a CVT control unit 84 (abbreviated "CVTCU"), a 4WD control unit 85 (abbreviated: "4WDCU"), and a lithium battery controller 86 (abbreviated: "LBC") are provided as control means that are connected to this hybrid control module 81. These control means including the hybrid control module 81 are connected so as to be capable of exchanging bidirectional information by a CAN communication line 90 (CAN is an abbreviation for "Controller Area Network").

The hybrid control module 81 carries out various controls, based on input information from each of the control means, an ignition switch 91, an accelerator position opening amount sensor 92, a vehicle speed sensor 93, and the like. The engine control module 82 carries out fuel injection control, ignition control, fuel cut control, and the like of the transverse engine 2. The motor controller 83 carries out powering control, regenerative control, and the like of the motor/generator 4 by the inverter 26. The CVT control unit 84 carries out the engagement hydraulic pressure control of the first clutch 3, the engagement hydraulic pressure control of the second clutch 5, the shifting hydraulic pressure control of the belt type continuously variable transmission 6, and the like. The lithium battery controller 86 manages the battery SOC, the battery temperature, and the like of the high power battery 21.

The 4WD control unit 85 receives signals from a 4WD mode switch 94, a wheel speed sensor 95, a steering angle sensor 96, a yaw rate sensor 97, a G sensor 98, a brake switch 99, and the like. Then, the control unit outputs a transmission torque command value to the electronically controlled coupling 42 after carrying out a predetermined calculation steps. For example, when auto (AUTO) is selected in the 4WD mode switch 94, the control unit selects a final command torque from among an initial torque steps, a differential rotation torque steps, and a drive force distribution torque steps by select-high, and controls the drive force distribution to the front wheels 10R, 10L and the rear wheels 11R, 11L. The driving force distribution ratio to be controlled is a stepless distribution ratio in which the (front wheel distribution ratio:rear wheel distribution ratio) is from (100%:0%, front wheel drive) to (50%:50%, four-wheel, etc., distribution drive).

Detailed Configuration of the Electronically Controlled Coupling

Figure 2:
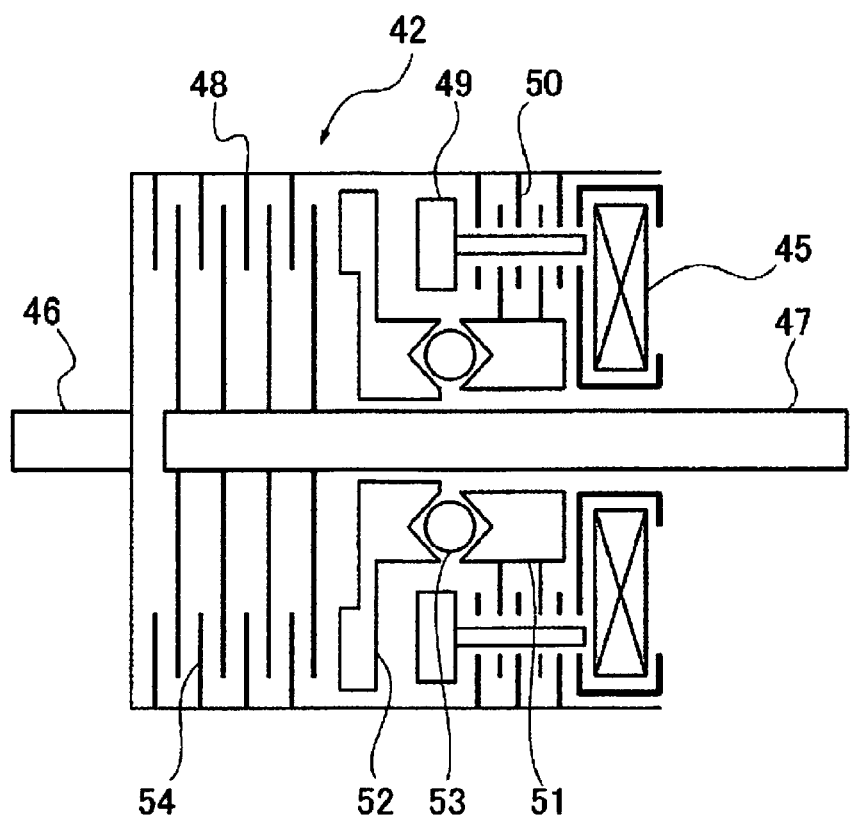
FIG. 2 is a schematic view illustrating the electronically controlled coupling that is provided to a rear wheel drive system of a four-wheel drive hybrid vehicle to which is applied the control device of the first embodiment.
Figure 3:
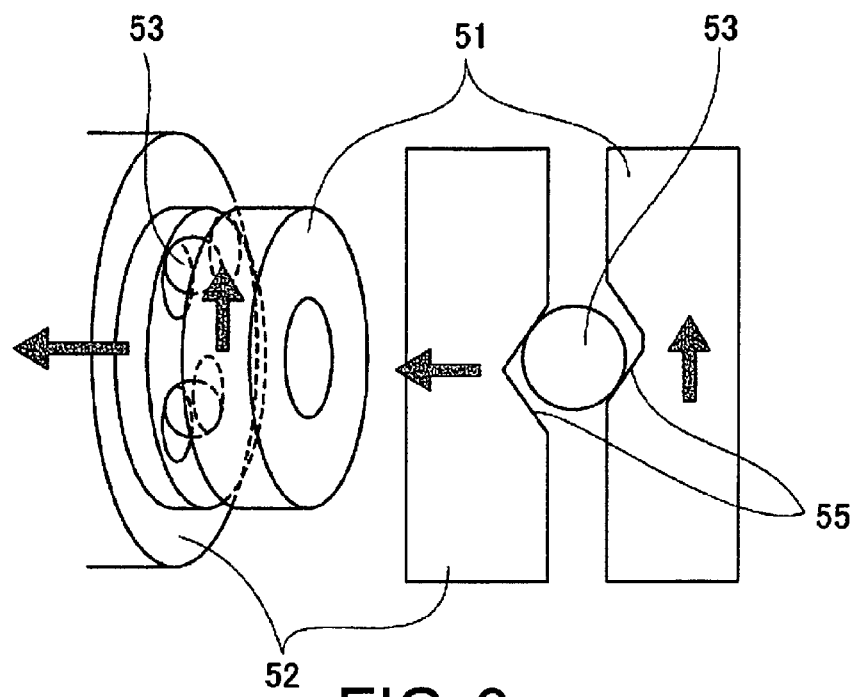
FIG. 3 is a perspective view illustrating a cam mechanism of the electronically controlled coupling.

FIG. 2 is a schematic view illustrating the electronically controlled coupling 42, and FIG. 3 is a perspective view illustrating the cam mechanism of the electronically controlled coupling 42. The detailed configuration of the electronically controlled coupling 42 will be described below, based on FIG. 2 and FIG. 3.

The electronically controlled coupling 42 comprises a solenoid 45, a coupling input shaft 46, a coupling output shaft 47, a clutch housing 48, an armature 49, a control clutch 50, a control cam 51, a main cam 52, a ball 53, a main clutch 54, and a cam groove 55, as illustrated in FIG. 2 and FIG. 3.

One end of the coupling input shaft 46 is coupled to the propeller shaft 41, and the other end is fixed to the clutch housing 48. The coupling output shaft 47 is fixed to an input gear of the rear final drive 43.

The control clutch 50 is a clutch that is interposed between the clutch housing 48 and the control cam 51. The main clutch 54 is a clutch that is interposed between the clutch housing 48 and the coupling output shaft 47.

The cam mechanism is configured from the control cam 51, the main cam 52, and the ball 53 sandwiched between cam grooves 55, 55 formed in the two cams 51, 52, as illustrated in FIG. 3.

Here, the engagement operation of the electronically controlled coupling 42 will be described. First, when a current is applied to the solenoid 45 by a command from the 4WD control unit 85, a magnetic field is generated around the solenoid 45, which attracts the armature 49 to the control clutch 50 side. Friction torque is generated in the control clutch 50 by being pressed by this attracted armature 49, and the friction torque that is generated in the control clutch 50 is transmitted to the control cam 51 of the cam mechanism. The torque that is transmitted to the control cam 51 is amplified/converted to an axial direction torque via the cam grooves 55, 55 and the ball 53, and pressed the main cam 52 in the front direction. The main cam 52 presses the main clutch 54, and a friction torque proportional to the current value is generated in the main clutch 54. The torque that is generated in the main clutch 54 passes the coupling output shaft 47 and is transmitted to the rear final drive 43 as the drive torque.

Figure 4:
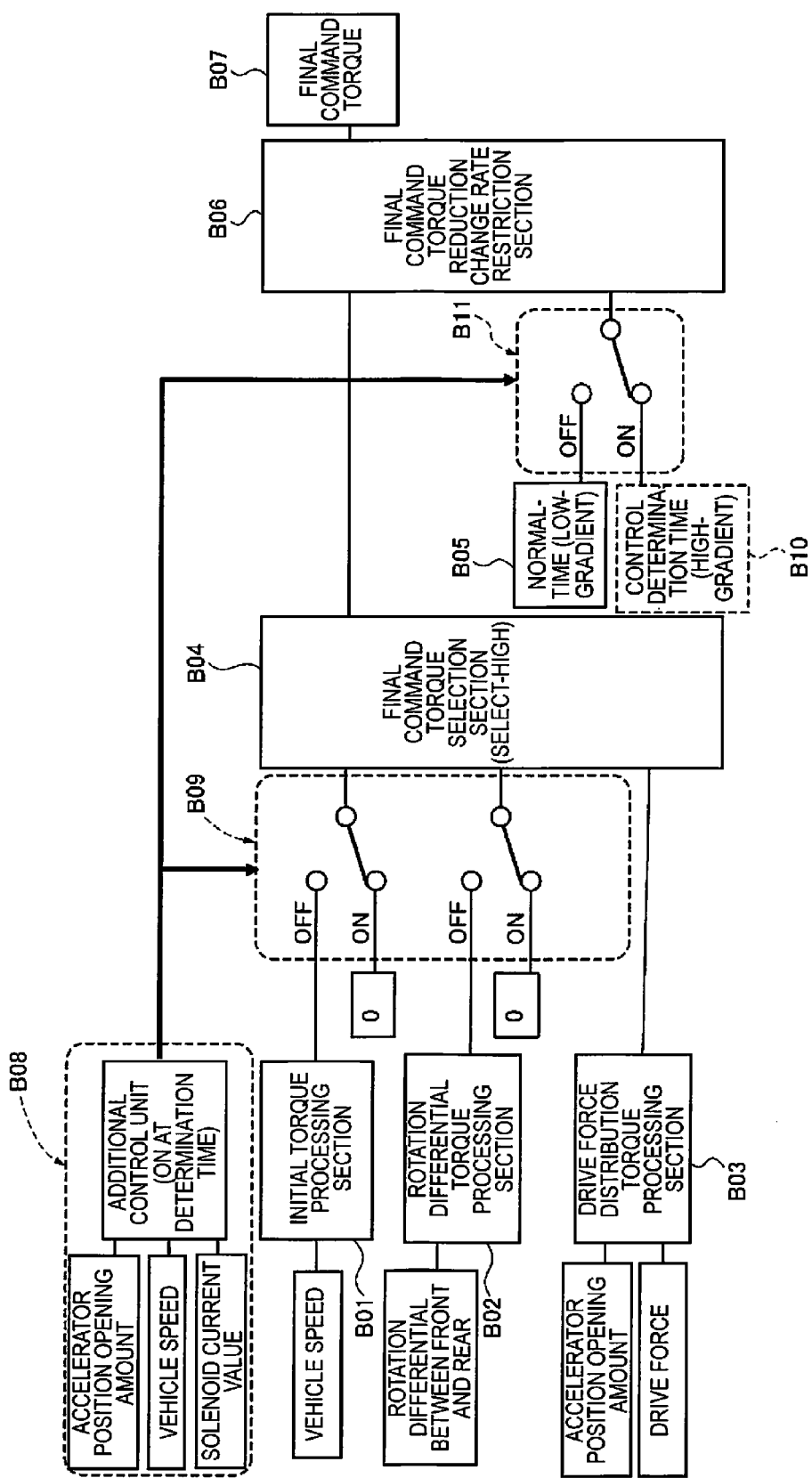
FIG. 4 is a block view illustrating the four-wheel drive power distribution control system having a regenerative control intervention-coordinating controller in the 4WD control unit of the first embodiment.

Detailed Configuration of the Regenerative Control Intervention-Coordinating Control FIG. 4 is a block view illustrating the four-wheel drive power distribution control system having a regenerative control intervention-coordinating controller in the 4WD control unit 85. The configuration of the four-wheel drive power distribution control system having a regenerative control intervention-coordinating controller will be described below, based on FIG. 4.

The four-wheel drive power distribution control system comprises an initial torque processing section B01 based on the vehicle speed, a differential rotation torque processing section B02 based on the differential rotation between the front and rear, and a drive force distribution torque processing section B03 based on the accelerator position opening amount and the drive force, as illustrated by the solid line block in FIG. 4. Then, a final command torque selection section B04 is provided, which selects from the torques from the processing sections B01, B02, B03 by select-high. Further provided are a final command torque reduction change rate restriction section B06, which restricts the reduction change rate of the selected final command torque based on the normal-time (low-gradient) block B05, and a final command torque block B07 which sets the torque with the restricted reduction change rate as the final command torque.

The regenerative control intervention-coordinating controller comprises a regenerative control intervention prediction determination block B08, a torque switching block B09, a control determination time (high-gradient) block B10, and a gradient switching block B11, as illustrated by the dotted line block in FIG. 4.

Figure 5:
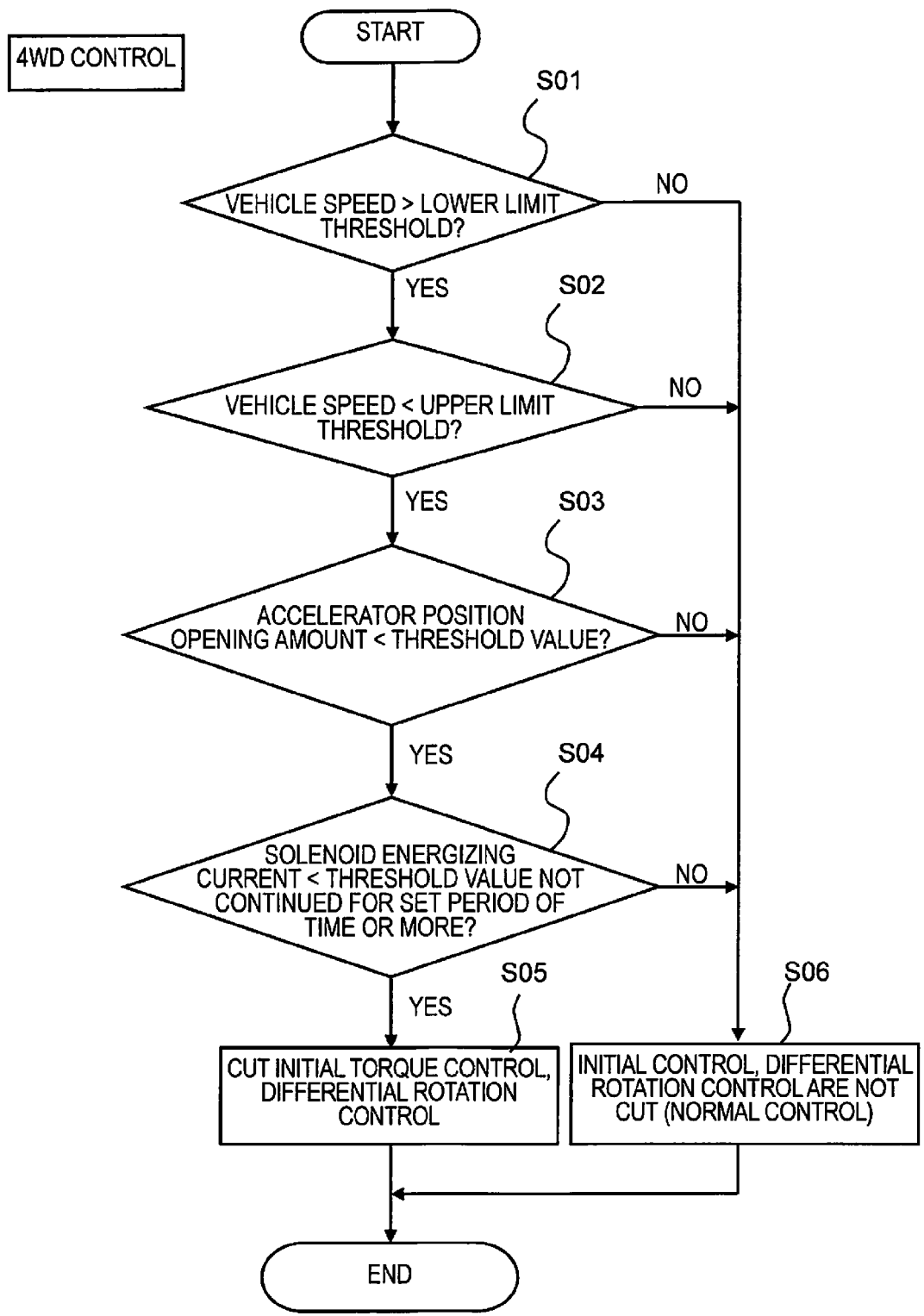
FIG. 5 is a flowchart illustrating a flow of a regenerative control intervention prediction determination steps that are executed in a regenerative control intervention prediction determination block of the regenerative control intervention-coordinating controller.

The regenerative control intervention prediction determination block B08 receives the accelerator position opening amount, the vehicle speed, and the solenoid current value, and outputs a regenerative control intervention prediction determination signal, when the vehicle speed is in a regenerative vehicle speed region, the accelerator position opening amount is a threshold value or lower, and the solenoid energizing current has been maintained less than a threshold value for a set period of time (FIG. 5).

When receiving a regenerative control intervention prediction determination signal from the regenerative control intervention prediction determination block B08, the torque switching block B09 sets the torque from the initial torque processing section B01 to zero (cut), and sets the torque from the differential rotation torque processing section B02 to zero (cut).

When receiving a regenerative control intervention prediction determination signal from the regenerative control intervention prediction determination block B08, the gradient switching block B11 switches from a normal-time decreasing gradient (low-gradient) from the normal-time (low-gradient) block B05 to a control determination time decreasing gradient (high-gradient) from the control determination time (high-gradient) block B10.

FIG. 5 illustrates a flow of a regenerative control intervention prediction determination steps that are executed in a regenerative control intervention prediction determination block B08 of the 4WD control unit 85. Each step in FIG. 5 will be described below.

In Step S01, it is determined whether or not the vehicle speed has exceeded a lower limit threshold for carrying out regeneration during a brake operation. If YES (vehicle speed>lower limit threshold), the steps proceed to Step S02, and if NO (vehicle speed≤lower limit threshold), the steps proceed to Step S06.

In Step S02, following the determination that vehicle speed>lower limit threshold in Step S01, it is determined whether or not the vehicle speed is less than an upper limit threshold for carrying out regeneration during a brake operation. If YES (vehicle speed<upper limit threshold), the steps proceed to Step S03, and if NO (vehicle speed≥upper limit threshold), the steps proceed to Step S06.

In Step S03, following the determination that vehicle speed<upper limit threshold in Step S02, it is determined whether or not the accelerator position opening amount is less than a threshold value. If YES (accelerator position opening amount<threshold value), the steps proceed to Step S04, and if NO (accelerator position opening amount≥threshold value), the steps proceed to Step S06. Here, the threshold value of the accelerator position opening amount is a threshold value for determining an accelerator position opening, and is intrinsically zero, but is set to a slight opening value that takes into consideration sensor noise and the like.

In Step S04, following the determination that accelerator position opening amount<threshold value in Step S03, it is determined whether or not solenoid energizing current<threshold value has not been continued for a set period of time or longer. If YES (duration that solenoid energizing current<threshold value is less than a set period of time), the steps proceed to Step S05, and if NO (duration that solenoid energizing current<threshold value is equal to or greater than a set period of time), the steps proceed to Step S06. Here, the threshold value of the solenoid energizing current is a threshold value for determining that the solenoid energizing current is zero, and is intrinsically zero, but is set to a slight current value that takes into consideration fine fluctuations in the current. In addition, a set period of time is set based on measurement results obtained by measuring the time required for the transmission torque to become zero, when the disengagement operations of the control clutch 50 and the main clutch 54 are completed after setting the solenoid energizing current to the electronically controlled coupling 42 to zero.

In Step S05, following the determination that the duration that solenoid energizing current<threshold value is less than a set period of time in Step S04, a regenerative control intervention prediction determination signal is outputted, the initial torque control and the differential rotation control are cut based on the output of this regenerative control intervention prediction determination signal, the decrease gradient of the solenoid energizing current is switched from a decrease according to a normal-time low-gradient to decrease according to a high-gradient, and the steps proceed to END. Here, when a regenerative control intervention prediction determination signal is outputted, a regenerative control inhibition request is outputted to a regeneration control section of the hybrid control module 81.

In Step S06, following a NO determination in any one of Step S01, Step S02, Step S03, and Step S04, a normal control in which the initial torque control and the differential rotation control are not cut, is carried out in a state in which the output of the regenerative control intervention prediction determination signal is stopped, and the steps proceed to END. Here, when the steps proceed to Step S06 when a regenerative control inhibition request is being outputted, the initial torque control and the differential rotation control are returned to normal control, based on the output of the regenerative control intervention prediction determination signal being stopped. Then, the decrease gradient of the solenoid energizing current is returned from a decrease according to a high-gradient to a decrease according to a normal-time low-gradient. In addition, the output of the regenerative control inhibition request to the regenerative control section of the hybrid control module 81 is stopped.

Figure 6:
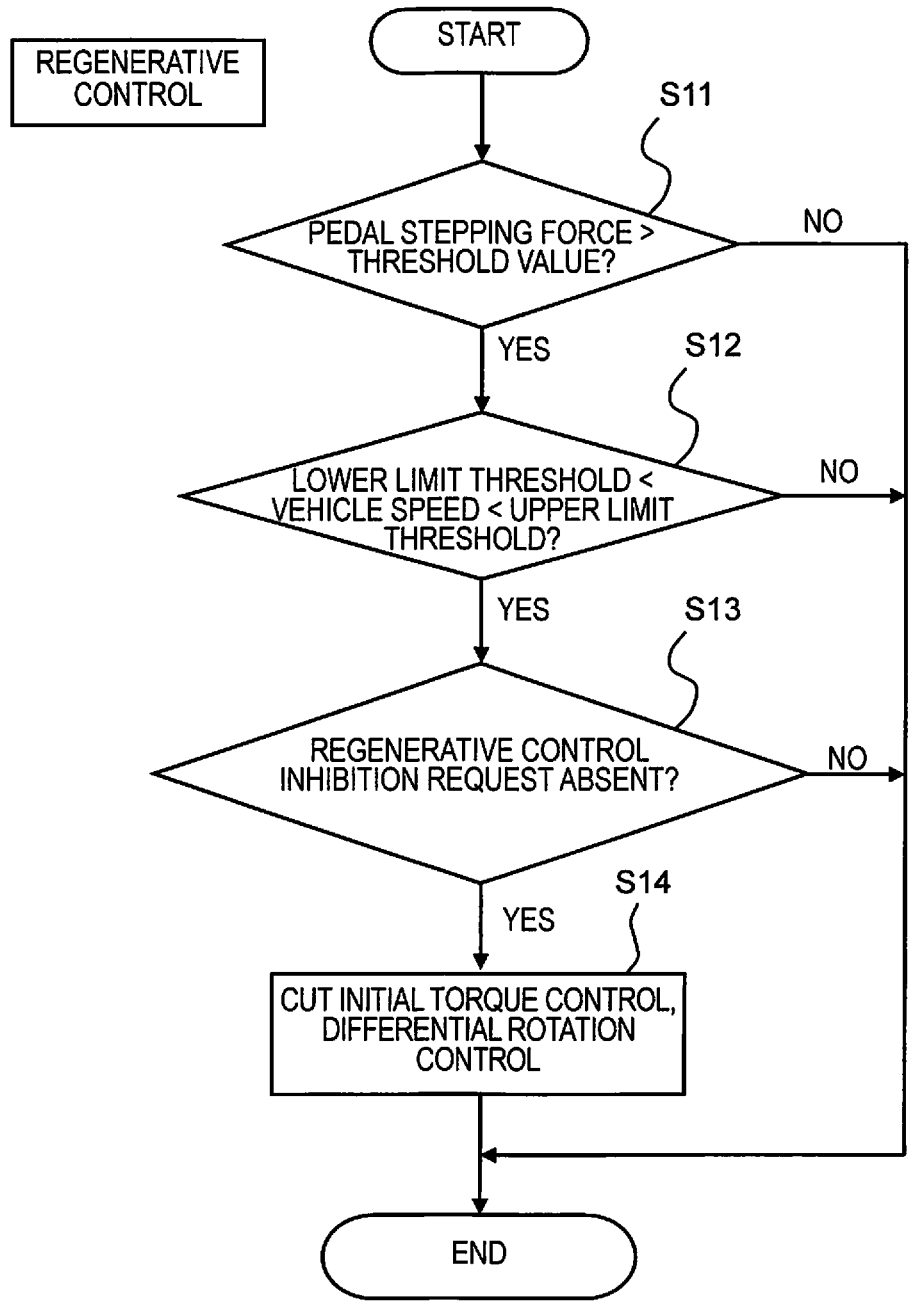
FIG. 6 is a flowchart illustrating a flow of a regenerative control start wait steps according to a regenerative control inhibition request, of the regenerative controls that are executed by the hybrid control module of the first embodiment.

FIG. 6 illustrates a flow of a regenerative control start wait steps according to a regenerative control inhibition request, of the regenerative controls that are executed by the hybrid control module 81. Each step in FIG. 6 will be described below.

In Step S11, it is determined whether or not the brake pedal stepping force has exceeded a threshold value. If YES (pedal stepping force>threshold value), the steps proceed to Step S12, and if NO (pedal stepping force≤threshold value), the steps proceed to END. Here, the threshold value of the pedal stepping force is set to a value for determining that a brake pedal stepping operation has been made.

In Step S12, following the determination that pedal stepping force>threshold value in Step S11, it is determined whether or not the vehicle speed has exceeded a lower limit threshold, and is within a regenerative control range that is less than an upper limit threshold. If YES (lower limit threshold<vehicle speed<upper limit threshold), the steps proceed to Step S13, and if NO (vehicle speed≤lower limit threshold or vehicle speed≥upper limit threshold), the steps proceed to END.

In Step S13, following the determination that lower limit threshold<vehicle speed<upper limit threshold in Step S12, it is determined whether or not a regenerative control inhibition request is absent. If YES (regenerative control inhibition request absent), the steps proceed to Step S14, and if NO (regenerative control inhibition request present), the steps proceed to END. Here, a regenerative control inhibition request is inputted by a regenerative control intervention prediction determination steps from the 4WD control unit 85.

In Step S14, following the determination that a regenerative control inhibition request is absent in Step S13, regenerative control is started and the steps proceed to END.

Next, the actions are described. The Shock/abnormal noise generation action during regenerative control intervention, and the Shock/abnormal noise suppressing action during regenerative control intervention will be separately described, regarding the actions in the control device for an FF base four-wheel drive hybrid vehicle of the first embodiment.

Shock/Abnormal Noise Generation Action During Regenerative Control Intervention

Figure 7:
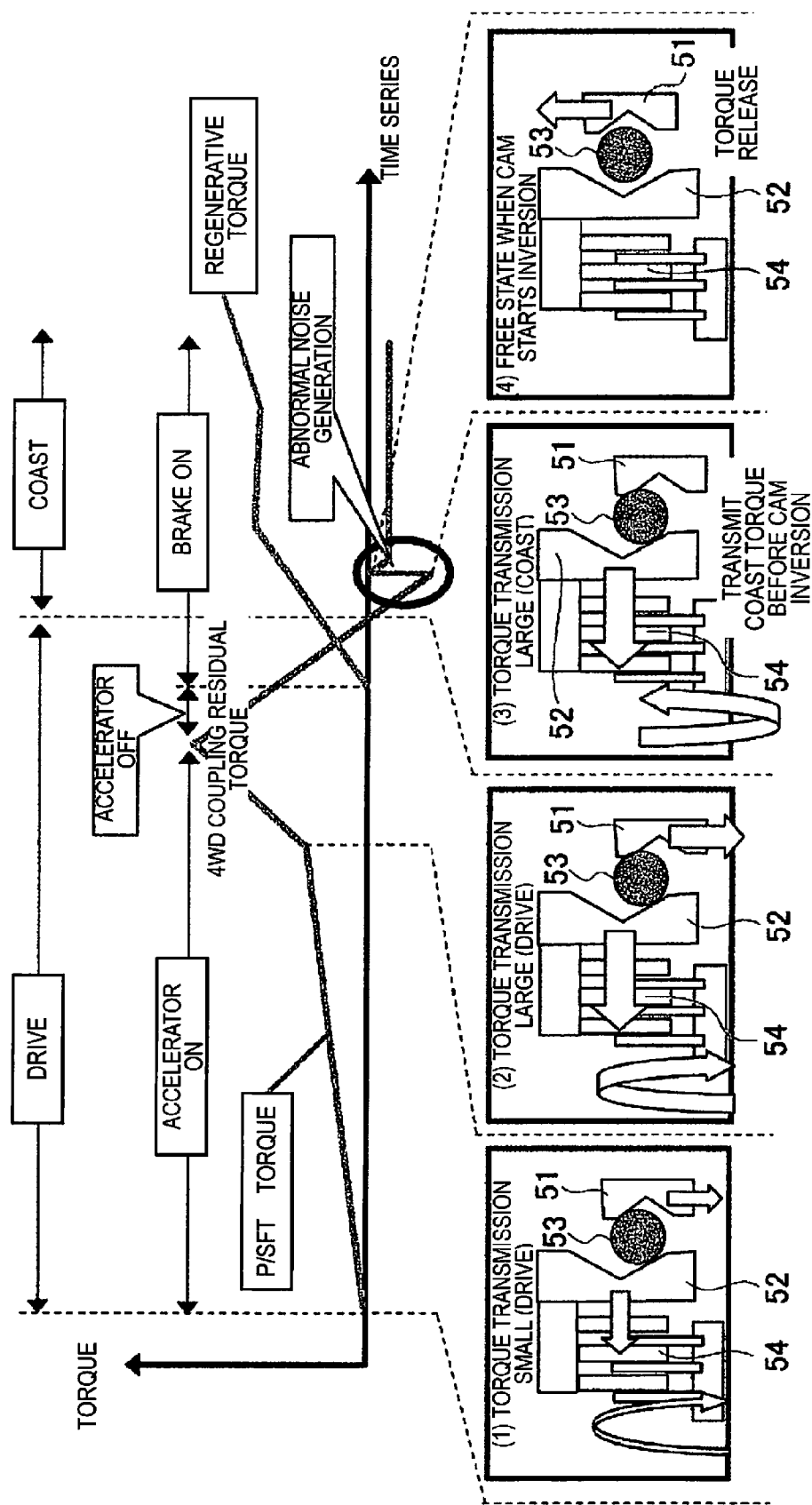
FIG. 7 is an explanatory view illustrating the generation mechanism of shock/abnormal noise which are generated in the cam mechanism of the electronically controlled coupling when the brake is depressed after an accelerator releasing operation.

FIG. 7 is illustrates the generation mechanism of shock/abnormal noise which are generated in the cam mechanism of the electronically controlled coupling 42 when the brake is depressed after an accelerator releasing operation. The generation mechanism of shock/abnormal noise during regenerative control intervention will be described below, based on FIG. 7.

Section (1) is a section in which the state is an accelerator ON drive state, torque is transmitted from the drive source to the drive wheels, and the propeller shaft torque is gradually increased; in this section (1), a ball 53 is sandwiched between cam grooves 55, 55 which are formed in the control cam 51 and the main cam 52, and the main clutch 54 is engaged under torque transmission small (drive).

Section (2) is a section in which accelerator ON→OFF is carried out, after which the brake is turned ON to generate regenerative torque; the propeller shaft torque is thereby rapidly increased then rapidly decreased, but the residual torque of the 4WD coupling is in a positive drive state. In this section (2), a ball 53 is sandwiched between cam grooves 55, 55 which are formed in the control cam 51 and the main cam 52, and the main clutch 54 is engaged under torque transmission large (drive).

Section (3) is a section in which the torque of the propeller shaft torque is reduced to a negative coast state, due to an increase in the regenerative torque. In this section (3), a ball 53 is kept sandwiched between cam grooves 55, 55 which are formed in the control cam 51 and the main cam 52, and the main clutch 54 is engaged under torque transmission large (coast). That is, the state becomes a coast torque transmission state before cam reversal.

Section (4) is a section in which, with the propeller shaft torque being in a negative coast state, the control cam 51 starts to be inverted with the regenerative torque>coupling torque being satisfied, and the ball 53 between the cam grooves 55, 55 shifts from a sandwiched state to a free state. In this section (4), by the torque being released at once and entering a neutral state, a large coast torque rapidly fluctuates toward zero torque, and shock and abnormal noise are generated by this fluctuating torque.

Figure 8:
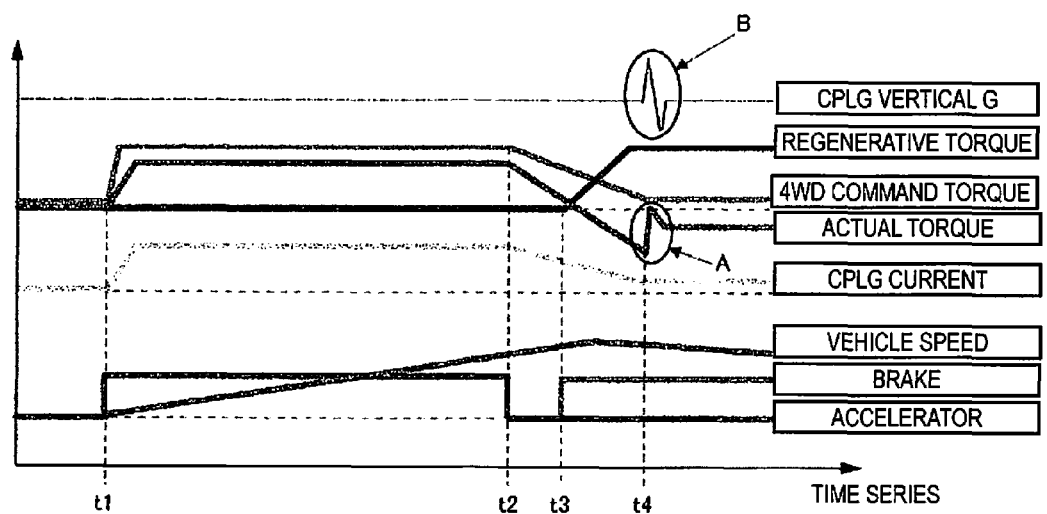
FIG. 8 is a time chart illustrating each characteristic of a coupling vertical G/regenerative torque/4WD command torque/actual torque/coupling current/vehicle speed/brake/accelerator, at the time of regenerative control intervention when the brake is depressed after an accelerator releasing operation in a comparative example.

FIG. 8 is a time chart illustrating each characteristic at the time of regenerative control intervention when the brake is depressed after an accelerator releasing operation in a comparative example. The shock/abnormal noise generation action during regenerative control intervention in a comparative example will be described below, based on FIG. 8.

One in which a cooperative control is not carried out between a transmission torque control to the electronically controlled coupling during an accelerator operation and a regenerative torque control during a brake operation, which are each independently controlled, shall be the comparative example. In the case of this comparative example, an accelerator depression operation is carried out at time t1, the foot is taken away from the accelerator at time t2, and a brake depression operation is carried out at time t3. At this time t3, while there is a generation of regenerative torque in accordance with the brake depression operation, the actual torque is reduced by a gradual slope until time t4. Accordingly, as described above in the generation mechanism, when entering the neutral state by an inversion of the control cam 51 at time t4, the actual torque is abruptly changed from a large coast torque to zero torque, as illustrated by the actual torque characteristic indicated by arrow A. Then, accompanying this abrupt change in the actual torque, shock/abnormal noise is generated, as illustrated by the coupling vertical G characteristic of arrow B.

Shock/Abnormal Noise Suppressing Action During Regenerative Control Intervention The shock/abnormal noise suppressing action during regenerative control intervention in the first embodiment will be described based on FIG. 4-FIG. 6.

The drive force distribution control in the 4WD control unit 85 will be described. When the regenerative vehicle speed condition (lower limit threshold<vehicle speed<upper limit threshold) is satisfied, the accelerator position opening condition (accelerator position opening amount<threshold value) is satisfied, and the duration that solenoid energizing current<threshold value is less than a set period of time, the steps proceed from Step S01→Step S02→Step S03→Step S04→Step S05 in the flowchart of FIG. 5. In Step S05, a regenerative control intervention prediction determination signal is outputted, the initial torque control and the differential rotation control are cut, and the decrease gradient of the solenoid energizing current is switched from a decrease according to a normal-time low-gradient to decrease according to a high-gradient. That is, when receiving a regenerative control intervention prediction determination signal from the regenerative control intervention prediction determination block B08, the torque switching block B09 sets the torque from both the initial torque processing section B01 and the differential rotation torque processing section B02 to zero (cut), as illustrated in FIG. 4. In addition, when receiving a regenerative control intervention prediction determination signal from the regenerative control intervention prediction determination block B08, the gradient switching block B11 switches from a normal-time decreasing gradient (low-gradient) to a control determination time decreasing gradient (high-gradient). In addition, a regenerative control inhibition request is outputted to the regenerative control section of the hybrid control module 81, while a regenerative control intervention prediction determination signal is being outputted.

Then, if the duration that solenoid energizing current<threshold value becomes equal to or greater than a set period of time, the steps proceed from Step S01→Step S02→Step S03→Step S04→Step S06 in the flowchart of FIG. 5. In Step S06, the output of the regenerative control intervention prediction determination signal is stopped, the control is returned to a normal control in which the initial torque control and the differential rotation control are not cut, and the decrease gradient of the solenoid energizing current is switched from a decrease according to a high-gradient to a decrease according to a normal-time low-gradient. When the steps proceed to Step S06 when a regenerative control inhibition request is being outputted, the regenerative control inhibition request to the regenerative control section of the hybrid control module 81 is withdrawn, based on the output of the regenerative control intervention prediction determination signal being stopped.

Next, the regenerative control in the hybrid control module 81 will be described. When the brake pedal stepping force condition (pedal stepping force>threshold value) and the regenerative vehicle speed condition (lower limit threshold<vehicle speed<upper limit threshold) are satisfied, the steps proceed from Step S11→Step S12→Step S13, in the flowchart of FIG. 6. In Step S13, it is determined whether or not a regenerative control inhibition request is absent; if a regenerative control inhibition request is present, the steps proceed to END, and the starting of regenerative control is postponed even though the regenerative control condition during braking is satisfied. Then, if it is determined that a regenerative control inhibition request is absent in Step S13, the steps proceed to Step S14, and regenerative control is started in Step S14. That is, while a regenerative control intervention prediction determination signal is being outputted, the starting of regenerative control is postponed even if a brake depression operation is carried out.

Figure 9:
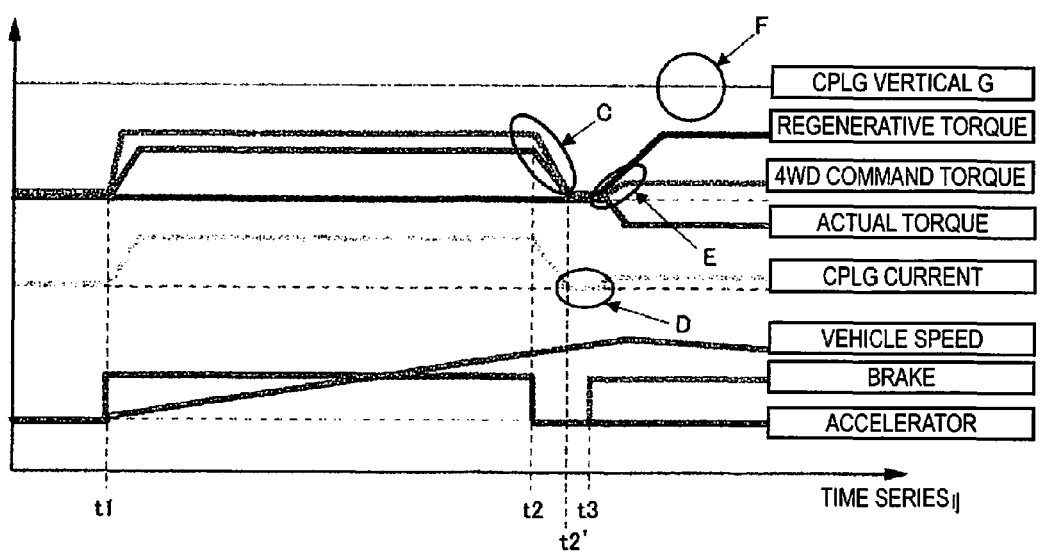
FIG. 9 is a time chart illustrating each characteristic of a coupling vertical G/regenerative torque/4WD command torque/actual torque/coupling current/vehicle speed/brake/accelerator, at the time of regenerative control intervention when the brake is depressed after an accelerator releasing operation in the first embodiment.

FIG. 9 is a time chart illustrating each characteristic at the time of regenerative control intervention when the brake is depressed after an accelerator releasing operation in the first embodiment. The shock/abnormal noise generation action during regenerative control intervention in the first embodiment will be described below, based on FIG. 9.

In the case of the first embodiment, in the same way as the comparative example, an accelerator depression operation is carried out at time t1, the foot is taken away from the accelerator at time t2, and a brake depression operation is carried out at time t3. At time t2 when a foot is taken away from the accelerator, the decrease gradient of the 4WD command torque (actual torque) is a high-gradient, as illustrated by the 4WD command torque characteristic (actual torque characteristic) of arrow C in FIG. 9. Accordingly, the 4WD command torque (actual torque) has become zero at time t2', which is immediately after time t2.

Then, the duration in which the coupling current is maintained zero is checked, as illustrated by the coupling current characteristic of arrow D in FIG. 9. Then, when the duration condition of the brake depression operation after time t3 is satisfied, regenerative control is started while returning to the normal 4WD control, as illustrated by the regenerative torque characteristic and the 4WD command torque characteristic of arrow E in FIG. 9. In this manner, since the residual torque of the electronically controlled coupling 42 is set to zero and regenerative control is started at the time of a brake depression operation after an accelerator releasing operation, generation of shock/abnormal noise is suppressed, as illustrated by the coupling vertical G characteristic of arrow F in FIG. 9.

As described above, in the first embodiment, a configuration is employed in which, at the time of a brake depression operation after an accelerator releasing operation, a cooperative control by a regenerative control intervention is carried out, in which the transmission torque of the electronically controlled coupling 42 is set to zero, before starting regenerative control by the motor/generator 4. That is, the residual torque (drive torque) of the electronically controlled coupling 42 becomes zero before the coast torque occurring due to the intervention of regenerative control is inputted to the electronically controlled coupling 42. Accordingly, torque transmission of the electronically controlled coupling 42 is suppressed, even if regenerative control has intervened. As a result, generation of shock by regenerative control intervention can be prevented when the brake is depressed after an accelerator depression operation.

In the first embodiment, a configuration is employed in which the regenerative control intervention prediction determination block B08 outputs a regenerative control intervention prediction determination signal when a regenerative vehicle speed condition and an accelerator position opening condition are satisfied, and when a regenerative control intervention prediction determination signal is outputted, the decrease gradient of the transmission torque command value from the gradient switching block B11 is set to be a higher gradient than the normal-time decrease gradient having a response delay. That is, during a normal time in which there is no intervention of regenerative control, when setting the transmission torque command value to the electronically controlled coupling 42 to zero by an accelerator releasing operation, the transmission torque command value is reduced by a gradual decrease gradient in order to prevent a rapid change in the drive force distribution. However, if the transmission torque command value is reduced by a gradual decrease gradient in a situation in which a regenerative control intervention is expected, the time required for the transmission torque (residual torque) of the electronically controlled coupling 42 to become zero becomes long. In contrast, since the transmission torque command value is reduced by a steep decrease gradient in a situation in which a regenerative control intervention is expected, a rapid change in the drive force distribution during a normal time can be prevented, while being able to set the transmission torque of the electronically controlled coupling 42 to zero in a short period of time, in a situation in which a regenerative control intervention is expected. In addition, the wait time for starting the regenerative control is shortened, and the regenerative efficiency can be improved compared to a case in which the decrease gradient is not changed.

In the first embodiment, a configuration is employed in which the regenerative control inhibition request is outputted for a predetermined time from an output of a regenerative control intervention prediction determination signal, and when a regenerative vehicle speed condition is satisfied when the brake is depressed, the starting of the regenerative control by the motor/generator 4 is delayed while the regenerative control inhibition request is being outputted. That is, the regenerative control by the motor/generator 4 is a responsive control, and a coast torque is immediately generated when regenerative control is started. Accordingly, if a regenerative control intervention is expected, regenerative control is started after the transmission torque of the electronically controlled coupling 42 has reliably become zero, by delaying the start of the regenerative control by the motor/generator 4 until a predetermined time has elapsed from the predicted time. Therefore, if a regenerative control intervention is expected, the generation of shock due to regenerative control intervention can be reliably prevented when the brake is depressed after an accelerator releasing operation, by delaying the start of regenerative control on the regenerative control side.

In the first embodiment, a configuration is employed in which, when a regenerative control intervention prediction determination signal is outputted, the initial torque control and the differential rotation torque control are cut off, and when a predetermined time has elapsed since the output of a command value to set the transmission torque of the electronically controlled coupling 42 to zero, the cutting of the initial torque control and the differential rotation torque control is released, and returned to a normal control. That is, since the transmission torque of the electronically controlled coupling 42 is set to zero, if a regenerative control intervention is expected, it is necessary to cut the initial torque control and the differential rotation torque control. However, there is a desire to recover the cut control at an early stage. Thus, the control are recovered when a predetermined time has elapses since an output of a transmission torque zero command value to the electronically controlled coupling 42. Therefore, transmission torque can be generated by a normal four-wheel drive force distribution control during regenerative control by the motor/generator 4.

In the first embodiment, a configuration is employed in which the electronically controlled coupling 42 comprises a control clutch 50, a cam mechanism configured from a ball 53 that is sandwiched between cam grooves 55, 55 formed in a control cam 51 and a main cam 52, and a main clutch 54. Therefore, shock occurring due to the intervention of regenerative control while operating in the four-wheel drive state can be prevented, while preventing generation of abnormal noise by the cam mechanism.

Next, the effects are described.
The effects listed below can be obtained with the control device for an FF base four-wheel drive hybrid vehicle according to the first embodiment.

(1) A control device for a four-wheel drive electric vehicle (FF base four-wheel drive hybrid vehicle), in which a drive source has a motor/generator 4, and an electronically controlled coupling 42 is provided on a drive power transmission path leading from a drive source to front and rear wheels, which controls the power distribution of the front and rear wheels by a command from the outside, comprising a four-wheel drive power distribution control means (4WD control unit 85) that outputs to the electronically controlled coupling 42 a transmission torque command value to bring about a four-wheel drive state, in accordance with the vehicle state, wherein the four-wheel drive power distribution control means (4WD control unit 85) has a regenerative control intervention-coordinating controller (FIG. 5) that, when regenerative control by the motor/generator 4 has intervened during the four-wheel drive state, brings a transmission torque of the electronically controlled coupling 42 to zero before initiating regenerative control. Accordingly, it is possible to prevent shock from occurring due to the intervention of regenerative control while operating in the four-wheel drive state.

(2) Comprising a regenerative control means (hybrid control module 81) that outputs a regenerative torque command value to the motor/generator 4 in accordance with a brake depression operation amount at the time of a brake operation, wherein the four-wheel drive power distribution control means (4WD control unit 85) outputs a transmission torque command value that changes a front and rear wheel transmission torque in accordance with an accelerator depression operation amount at the time of an accelerator operation to the electronically controlled coupling 42, and the regenerative control intervention-coordinating controller (FIG. 5) sets the transmission torque of the electronically controlled coupling 42 to zero before starting regenerative control by the motor/generator 4, at the time of a brake depression operation after an accelerator releasing operation. Accordingly, in addition to the effect of (1), generation of shock by regenerative control intervention can be prevented when the brake is depressed after an accelerator depression operation.

(3) The four-wheel drive power distribution control means (4WD control unit 85) comprises a transmission torque instruction section (gradient switching block B11) that reduces the transmission torque command value with a predetermined response delay, when reducing the transmission torque command value following a reduction in the accelerator operation amount, and the regenerative control intervention-coordinating controller (regenerative control intervention prediction determination block B08) outputs a regenerative control intervention prediction determination signal when a regenerative vehicle speed condition and an accelerator position opening condition are satisfied, and when a regenerative control intervention prediction determination signal is outputted, the decrease gradient of the transmission torque command value from the transmission torque instruction section (gradient switching block B11) is set to be a higher gradient than the normal-time decrease gradient having a response delay (FIG. 4). Accordingly, in addition to the effects of (2), a rapid change in the drive force distribution during a normal time can be prevented, while being able to set the transmission torque of the electronically controlled coupling 42 to zero in a short period of time, in a situation in which a regenerative control intervention is expected.

(4) The regenerative control intervention-coordinating controller (regenerative control intervention prediction determination block B08) outputs a regenerative control inhibition request for a predetermined period of time after an output of the regenerative control intervention prediction determination signal, and when a regenerative vehicle speed condition is satisfied when the brake is depressed, the regenerative control means (hybrid control module 81) delays the starting of the regenerative control by the motor/generator 4 while the regenerative control inhibition request is being outputted (FIG. 6). Accordingly, in addition to the effect of (3), generation of shock by regenerative control intervention can be reliably prevented when the brake is depressed after an accelerator depression operation.

(5) The four-wheel drive power distribution control means (4WD control unit 85) carries out an initial torque control based on the vehicle speed (initial torque processing section B01), a differential rotation torque control based on a differential rotation between the front and rear wheels (differential rotation torque processing section B02), and a drive force distribution torque control based on the accelerator position opening amount (differential rotation torque processing section B03), and when a regenerative control intervention prediction determination signal is outputted, the regenerative control intervention-coordinating controller (regenerative control intervention prediction determination block B08, torque switching block B09) cuts the initial torque control and the differential rotation torque control, and when a predetermined time has elapsed since the output of a command value to set the transmission torque of the electronically controlled coupling 42 to zero, the cutting of the initial torque control and the differential rotation torque control is released, and returned to a normal control (FIG. 4).

Accordingly, in addition to the effects of (3) or (4), transmission torque can be generated by a normal four-wheel drive force distribution control during regenerative control by the motor/generator 4.

(6) The electronically controlled coupling 42 is a coupling comprising a control clutch 50 that is engaged by a current value from the outside to the solenoid 45, a cam mechanism configured from a ball 53 that is sandwiched between cam grooves 55, 55 formed in a control cam 51 and a main cam 52, and a main clutch 54 that is engaged via the cam mechanism (FIGS. 2, 3). Accordingly, in addition to the effects of (1)-(5), shock occurring due to the intervention of regenerative control while operating in the four-wheel drive state can be prevented, while preventing generation of abnormal noise by the cam mechanism.

The control device for a four-wheel drive electric vehicle of the present invention was described above based on the first embodiment, but specific configurations thereof are not limited to this first embodiment, and various modifications and additions to the design can be made without departing from the scope of the invention according to each claim in the Claims.

In the first embodiment, an example was shown of a coupling having a control clutch 50, a cam mechanism, and a main clutch 54 as the electronically controlled coupling 42. However, as long as the coupling controls the front and rear wheel drive force distribution by a command from the outside, the electronically controlled coupling may be a multi-plate clutch or the like which is operated by control oil pressure.

In the first embodiment, an example was shown in which the control device of the present invention is applied to an FF base four-wheel drive hybrid vehicle. However, the control device of the present invention is not limited to an FF base four-wheel drive hybrid vehicle, and may be applied to an FR base four-wheel drive hybrid vehicle as well. In addition, the control device is not limited to a four-wheel drive hybrid vehicle, and may be applied to a four-wheel drive electric vehicle as well. In short, the present invention may be applied to any four-wheel drive electric vehicle, in which the drive source has a motor/generator, and an electronically controlled coupling is provided on the drive power transmission path leading from the drive source to the front and rear wheels, which controls the power distribution of the front and rear wheels by a command from the outside.

The invention claimed is:

1. A four-wheel drive electric vehicle control device for a four-wheel drive electric vehicle that includes a drive source having a motor/generator, and an electronically controlled coupling provided on a drive power transmission path leading from the drive source to front and rear wheels, the electronically controlled coupling being configured to control a power distribution of the front and rear wheels in accordance with a transmission torque command value, the four-wheel drive electric vehicle control device comprising:
a four-wheel drive power distribution control unit programmed to output the transmission torque command value to the electronically controlled coupling to bring about a four-wheel drive state,
the four-wheel drive power distribution control unit including a regenerative control intervention-coordinating controller programmed to bring a transmission torque of the electronically controlled coupling to zero before initiating a regenerative control by the motor/generator when the regenerative control is executed during the four-wheel drive state.

2. The four-wheel drive electric vehicle control device according to claim 1, wherein
the electronically controlled coupling is a coupling comprising a control clutch that is engaged by a current value applied to a solenoid, a cam mechanism configured from a ball that is sandwiched between cam grooves formed in a control cam and a main cam, and a main clutch that is engaged via the cam mechanism.

3. The four-wheel drive electric vehicle control device according to claim 1, further comprising:
a hybrid control module programmed to output a regenerative torque command value to the motor/generator in accordance with a brake depression operation amount at a time of a brake operation,
the four-wheel drive power distribution control unit being programmed to set the transmission torque command value to change a front and rear wheel transmission torque in accordance with an accelerator depression operation amount at a time of an accelerator operation, and
the regenerative control intervention-coordinating controller being programmed to set the transmission torque of the electronically controlled coupling to zero before starting the regenerative control by the motor/generator when the regenerative control is executed at the time of a brake depression operation after an accelerator releasing operation.

4. The four-wheel drive electric vehicle control device according to claim 3, wherein
the electronically controlled coupling is a coupling comprising a control clutch that is engaged by a current value applied to a solenoid, a cam mechanism configured from a ball that is sandwiched between cam grooves formed in a control cam and a main cam, and a main clutch that is engaged via the cam mechanism.

5. The four-wheel drive electric vehicle control device according to claim 3, wherein
the four-wheel drive power distribution control unit comprises a transmission torque instruction section programmed to reduce the transmission torque command value following a reduction in the accelerator depression operation amount, the reduction of the transmission torque command value being executed over time according to a decrease gradient to delay the reduction of the transmission torque command value, and
the regenerative control intervention-coordinating controller is programmed to output a regenerative control intervention prediction determination signal when a regenerative vehicle speed condition and an accelerator position opening condition are satisfied, the decrease gradient being set higher when the regenerative control intervention prediction determination signal is outputted than when the regenerative control intervention prediction determination signal is not outputted.

6. The four-wheel drive electric vehicle control device according to claim 5, wherein
the electronically controlled coupling is a coupling comprising a control clutch that is engaged by a current value applied to a solenoid, a cam mechanism configured from a ball that is sandwiched between cam grooves formed in a control cam and a main cam, and a main clutch that is engaged via the cam mechanism.

7. The four-wheel drive electric vehicle control device according to claim 5, wherein
the four-wheel drive power distribution control unit is programmed to perform an initial torque control based on vehicle speed, a differential rotation torque control based on a differential rotation between the front and rear wheels, and a drive force distribution torque control based on the accelerator depression operation amount, and when the regenerative control intervention prediction determination signal is outputted, the regenerative control intervention-coordinating controller is programmed to cut the initial torque control and the differential rotation torque control, and when a predetermined time has elapsed since the output of a command value to set the transmission torque of the electronically controlled coupling to zero, the cutting of the initial torque control and the differential rotation torque control is released.

8. The four-wheel drive electric vehicle control device according to claim 7, wherein the electronically controlled coupling is a coupling comprising a control clutch that is engaged by a current value applied to a solenoid, a cam mechanism configured from a ball that is sandwiched between cam grooves formed in a control cam and a main cam, and a main clutch that is engaged via the cam mechanism.

9. The four-wheel drive electric vehicle control device according to claim 5, wherein the regenerative control intervention-coordinating controller is programmed to output the regenerative control inhibition request for a predetermined period of time after an output of the regenerative control intervention prediction determination signal, and when the regenerative vehicle speed condition is satisfied when the brake is depressed, the regenerative control intervention-coordinating controller is programmed to delay starting of the regenerative control by the motor/generator while the regenerative control inhibition request is being outputted.

10. The four-wheel drive electric vehicle control device according to claim 9, wherein the electronically controlled coupling is a coupling comprising a control clutch that is engaged by a current value applied to a solenoid, a cam mechanism configured from a ball that is sandwiched between cam grooves formed in a control cam and a main cam, and a main clutch that is engaged via the cam mechanism.

11. The four-wheel drive electric vehicle control device according to claim 9, wherein the four-wheel drive power distribution control unit is programmed to perform an initial torque control based on vehicle speed, a differential rotation torque control based on a differential rotation between the front and rear wheels, and a drive force distribution torque control based on the accelerator depression operation amount, and when the regenerative control intervention prediction determination signal is outputted, the regenerative control intervention-coordinating controller is programmed to cut the initial torque control and the differential rotation torque control, and when a predetermined time has elapsed since the output of a command value to set the transmission torque of the electronically controlled coupling to zero, the cutting of the initial torque control and the differential rotation torque control is released.

* * * * *